July 2, 1940.  V. JERECZEK  2,206,479

DEVICE FOR EQUIDIRECTIONAL MILLING

Filed Sept. 24, 1936  2 Sheets-Sheet 1

Inventor
V. Jereczek
INVENTOR

By Glascock Downing & Seebold
Attorneys.

July 2, 1940.                V. JERECZEK                2,206,479
                   DEVICE FOR EQUIDIRECTIONAL MILLING
                       Filed Sept. 24, 1936        2 Sheets-Sheet 2
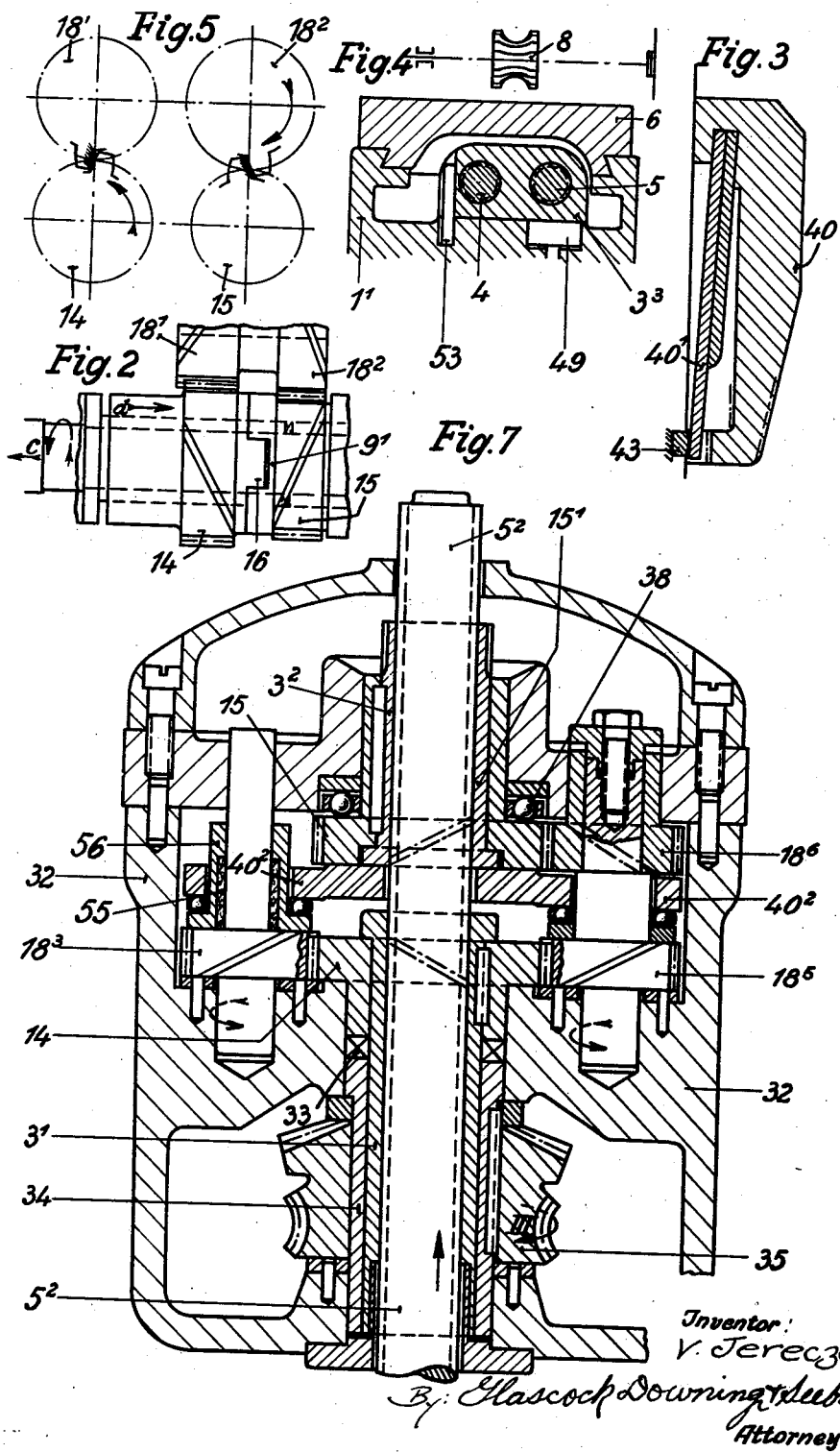

Patented July 2, 1940

2,206,479

UNITED STATES PATENT OFFICE 2,206,479

DEVICE FOR EQUIDIRECTIONAL MILLING

Viktor Jereczek, Tempelhof, near Berlin, Germany

Application September 24, 1936, Serial No. 102,412
In Germany September 25, 1935

7 Claims. (Cl. 90—22)

This invention relates to a device for equidirectional milling on metal milling machines.

With devices for equidirectional milling in which the forward feed of the work and the operative motion of the milling cutter have the same direction and in which, for instance, one or two driving or feed members having screw threads thereon which engage corresponding nuts are in driving connection with the table of the milling machine, it is known, that the feed members at the outset of their rotary movement are first of all moved idly relatively to one another by means of inclined sliding surfaces until the back lash in the feed members and between the latter and the table of the milling machine has been taken up. Owing to the axial pressure produced by the inclined faces which slide upon one another, there arises in the known devices of the kind stated a tightening-up of all parts of the gearing, especially when the milling cutter commences to work, whereby every unwished-for movement of the milling table is prevented. This state lasts as long as the milling tool loads uninterruptedly the table in the direction of the feed, when however, this load suddenly ceases, all parts are released from the tightening-up state down to zero, and when then the milling pressure again suddenly appears and rises to its maximum value the requisite tightening-up, that is to say, the intimate contact of all parts with one another, does not yet exist, whereby the uniformity of the table feed is impaired.

This case is experienced, for instance, when working with a straight-coarse-toothed, backed-off milling-cutter. These cutters present, from a technical point of view, the most unfavorable presuppositions for the severing-off of tough, hard material if the chips have only a slight thickness, as in this case only one cutter tooth of the milling-cutter can, at the time being, exert a cutting action, that tooth having cut off the chip before the next tooth can exert its cutting action. Owing thereto, the milling table and the members of the feed gearing are momentarily very strongly loaded, whereas in the next moment, before the next cutter tooth can exert its cutting action, the load sinks to zero.

The object of the invention is to ensure the uniformity of the table movement, and with this object in view the invention consists substantially therein that the spindles or the nuts of a feed gearing are connected with one another in such a maner that the thrust and pressure forces of the one spindle or nut are transmitted to the other spindle or nut so that a tightening-up state is continually maintained, which state ensures a sufficient mutual play-free contact between all members concerned.

With a device in which two axially movable threaded spindles are used, it is suited to the purpose in view to arrange the spindles in such a manner that they are in driving connection with a transverse supporting member abutting on the milling table or on any other suitable member, in such a way, that both spindles are loaded in opposite directions at the commencement of the feeding movement, as well as at the commencement of the cutting pressure and that thereby the inclined faces are shifted along one another in the sense of tightening-up the gearing counter to the cutting pressure.

In order to attain the effect desired it is suitable to produce already before the commencement of the milling operation a corresponding preliminary stressing in the feed gearing. For this purpose the load on the above-mentioned supporting member may be adjustable from the outside, and in order to be able to effect that preliminary stressing from only one place, there may be provided, according to this invention, an adjusting device arranged at such a place that the load on the above-mentioned supporting member is transmitted to the spindles and the oblique faces. Moreover, one or several power-accumulators may be arranged in the gearing so as to render possible to produce, by the load on the above-mentioned supporting member, an elastic preliminary stressing by means of which eventual loosenings of the mutual contact of the parts due to wear and tear can be compensated.

The invention is illustrated diagrammatically and by way of example on the accompanying drawings on which Figure 1 is a longitudinal section through the table of a milling machine and the appertaining feed-gearing, Figure 2 is a plan of some of the members shown in the lower half of the right-hand portion of Fig. 1;

Figure 3 shows a section through one of the members of the machine dealt with herein-after;

Figure 4 shows a transverse section in the plane A—B of Fig. 1, drawn to a reduced scale;

Figure 5 is a diagrammatic representation;

Figure 7 shows a vertical section through a feed-gearing for the hobbing cutter of a gear cutting machine.

Figures 1, 6:
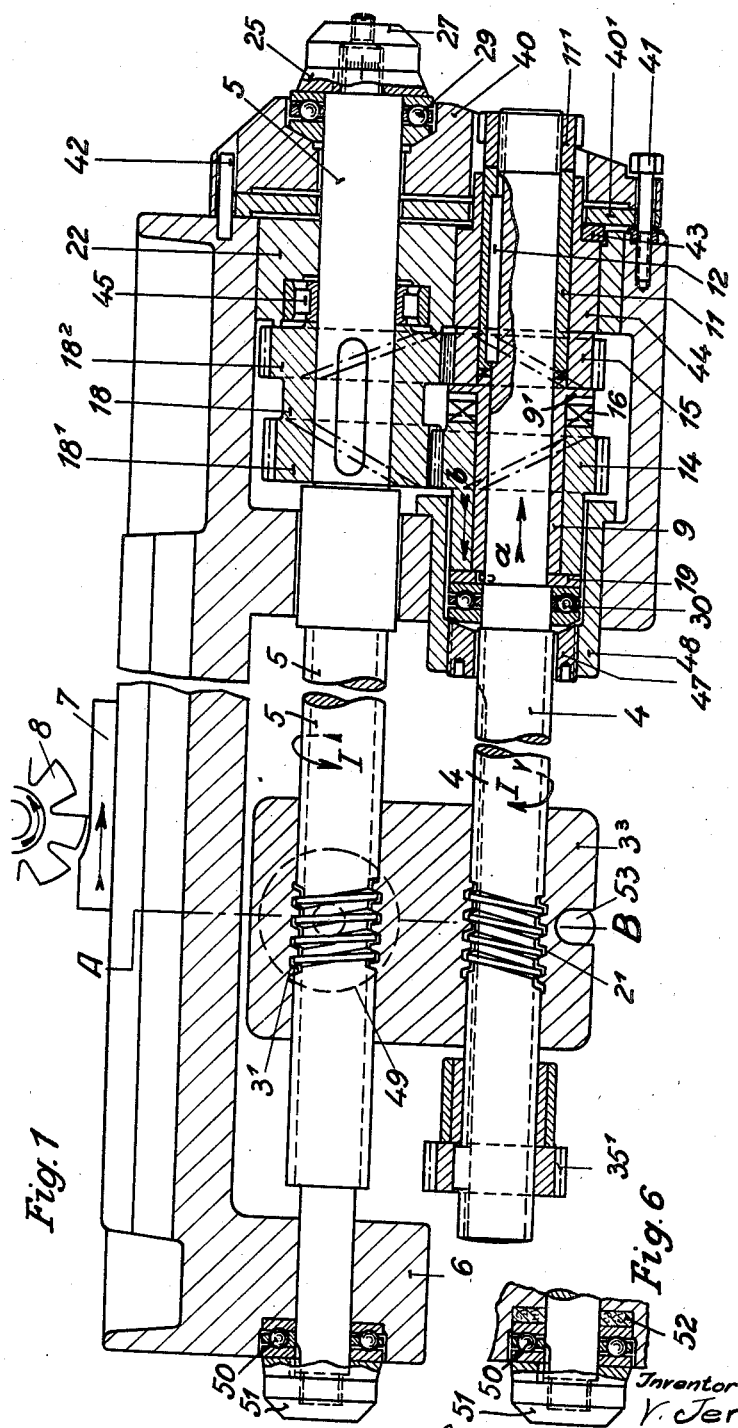
Figure 6 shows, partly in side-view and partly in section, a modified constructional form of the bearing located at the left-hand end of Fig. 1.

In Fig. 1 the two threaded spindles (4 and 5) are represented, for the sake of distinctness, as if lying one over the other, but they are lying, in fact, side by side, as shown in Fig. 4.

Said two spindles 4 and 5 which have oppositely-handed threads can rotate in correspondingly designed threads $2^1$ and $3^1$ which are united in one nut $3^3$ for the purposes hereinafter stated. The spindles 4, 5 serve for moving the milling table 6 with the work-piece 7 thereon to and fro on a transverse slide $1^1$ of a milling machine. For this purpose the threaded spindle 4 on which a driving cog-wheel $35^1$ is fastened and which can be turned in the one or the other direction according to the requisite direction of motion of said table, is provided with two helical wheels 14 and 15 having oppositely directed teeth. This arrangement is more fully dealt with hereinafter. Said wheels 14 and 15 engage two toothed rims $18^1$ and $18^2$ likewise provided with oppositely directed oblique teeth and constituting together a double-wheel 18. The latter is located on the threaded spindle 5 and is coupled therewith by a feather permitting axial movement of said double-wheel but preventing it from turning on said spindle. Instead of the two helical gearings 15 and $18^2$, two gear wheels with straight teeth may be employed. The threaded spindle 5 thus always turns in the opposite direction to the threaded spindle 4, and both spindles screw themselves forwardly or rearwardly in their respective nut threads $2^1$ and $3^1$ whereby the table 6 with the work-piece 7 on it is moved in one direction or the other.

The connection of the threaded spindles 4 and 5 with the table 6 and the transmission of the rotary motion from the one spindle to the other is effected as follows:

On the spindle 4 is provided a rotatable coupling sleeve 9 which is provided at its outer end with fine coupling teeth engaging correspondingly shaped teeth of a sleeve 11. This latter is connected with the spindle 4 by means of a feather key 12. By drawing tight a nut $11^1$ provided on the end of the spindle 4 the sleeve 9 will be firmly connected with said spindle, the sleeve 9 abutting then on a disk 19 secured to the said spindle and being prevented from turning on it. On the coupling sleeve 9 is axially shiftable the helical-wheel 14, the hub of which is provided with coupling teeth 16 engaging correspondingly shaped teeth of a collar $9^1$ provided on the sleeve 9. The left-hand hub-end of the helical-wheel 14 can also abut on the disk 19 if this wheel is axially shifted. On the sleeve 11 is loosely rotatable the helical-wheel 15 which when being axially shifted can abut at the one side on the collar $9^1$ and at the other side on the frontal face of a sleeve 44 arranged in the bearing shield 22 which is firmly connected to the table 6. The sleeve 44 can be shifted axially in its bearing, but not turned therein.

The helical wheels 14 and 15 engage, as has already been mentioned, the toothed rims $18^1$ and $18^2$ of the double-wheel 18 which is affixed to the spindle 5, and is prevented from turning thereon by a feather key, but can be axially shifted upon said spindle 5 and abut on the bearing shield 22 which is firmly connected to the table 6. That end of the spindle 5 which is located on the left-hand side of the drawings is connected with the table 6 by means of a nut 51 abutting on a ball-bearing 50. The other or right-hand end of said spindle is supported in a ball-bearing 29 arranged for the purpose explained below, in a transverse supporting member 40 consisting in the constructional form shown by way of example of a rigid member 40 and of an elastic plate $40^1$. In Fig. 3 it is shown that several such elastic plates $40^1$ may be employed.

The two ends of the transverse supporting member 40 abut, when the machine is at rest, on the milling table 6 and are guided by a pivot 42 and an adjustable screw 41. By means of a nut 27 provided on the right-hand end of the spindle 5 the transverse supporting member 40 can be firmly pressed against the table 6 whereby at the same time also the spindle 5 is firmly clamped and connected with said table. The sleeve 44 which is shiftable on the spindle 4 extends freely through the transverse supporting member 40 and carries a thrust member 43 which when said last-mentioned spindle makes a feed-movement abuts on said member 40 and loads it. The left-hand end of the spindle 4 is not connected with the table 6, but supported merely in the frame of the machine.

The manner of operation of the above-described device is as follows, it being assumed that a straight-coarse-toothed backed-off milling cutter 8 is to act on the work-piece 7 in the direction of the feed and the work-piece is to be moved towards the cutter. In this case the two spindles 4 and 5 are rotated in the direction indicated by the arrows I.

The spindle 4, the left-hand sides of the thread of which abut on the right-hand sides of the thread of the nut $2^1$, is at this rotation moved to the right (arrow a). The helical wheel 14 which takes part in that rotation of the spindle 4 across the coupling sleeve 9 and the coupling teeth 16 is, therefore, when the rotary motion commences, shifted to the left (arrow b) owing to the inclination of its teeth and of the teeth of the counter-wheel $18^1$.

In consequence of the axial movement of the spindle 4 in the direction of the arrow a this spindle shifts by means of the collar $9^1$ of the sleeve 9 and by means of the wheel 15 the sleeve 44 to the right. The thrust member 43 affixed to this sleeve acts now on the lower end of the transverse member 40, $40^1$ and shifts this end to the right. Owing to this loading of the member 40, $40^1$ a pull is exerted on the spindle 5 across the ball bearing 29, whereby the right-hand sides of the thread of this spindle are pressed against the left-hand sides of the thread of the nut $3^1$. When the threads have come in contact with one another in the direction to the right, the transverse member 40, $40^1$ shifts, at its further turning around the correspondingly designed ball-bearing 29, the table 6, by means of its upper end, to the left until the ball-bearing 50 abuts tightly on the nut 51. Now the gearing has been completely tightened-up in axial direction.

The helical wheel 14 which, as has already been mentioned, has been pressed to the left while the above-stated movements were carried out, has now with its hub come in contact with the ring 19 which contacts, in turn, with the ball-bearing 30. The helical wheel 14 turns now the counter-wheel $18^1$ and thereby also the spindle 5. When this rotary movement commences, there is effected owing to the inclination of the teeth, an axial pressure upon the double-wheel 18 in the direction to the right. The toothed rim 18² of the double-wheel 18 engages the helical wheel 15 which is freely rotatable upon the spindle 4 and which has a smaller diameter and, therefore, a higher rotary speed than the wheel 18². By reason of this increase of the number of revolutions of the wheel 15, and of the pressure exerted on this wheel by the axial movement of the spindle 4, there is obtained a greater turning moment for the helical wheel 13¹, in consequence whereof the axial thrust of the double-wheel 18 is increased, this thrust being transmitted to the shield 22 which is firmly connected with the table 6, and acting in the direction of the feed.

Owing to the higher rotary speed of the helical wheel 15 relatively to the helical wheel 14, and owing to the tightening-up pressure produced by the axial thrust of the spindle 4, there arises at the wheel 15 a resistance with the effect that the four gearings of the helical wheels are tightened with respect to one another also in tangential direction, so that the position of the flanks of the teeth as shown in Fig. 5 is continually maintained.

In consequence of the tightening-up of all parts when the rotary motion of the spindle 4 commences, the plate 40¹ of the transverse supporting member is bent, whereby an elastic preliminary tightening-up is obtained by which eventual loosenings at the contacting faces of the members concerned due to wear and tear or other causes are compensated.

As soon as the tightening-up of all parts has taken place, the feed-movement of the milling table with the work-piece 7 thereon commences in the direction of the arrow shown on the work piece. When now the milling cutter engages the work-piece, the pressure due to the cutting action acts upon the table 6 in the direction of the feed, whereby the upper end of the transverse supporting member 40 is loaded. The lower end of this member which turns around the ball-bearing 29 presses, owing to that loading, upon the sleeve 44 by the intermediary of the thrust-member 43, in consequence whereof the helical wheel 15 is subjected to a stronger lateral pressing entailing a greater turning moment causing a stronger axial thrust of the double-wheel 18 in the direction to the right. This wheel is, therefore, stronger pressed against the bearing shield 22, in consequence whereof the spindle 5 is braked.

Supposing, the milling pressure ceases suddenly owing to the cutting edge of the milling cutter engaging the work-piece having finished the cutting operation, a complete tightening-down between the parts of the gearing which would give rise to idle or lost motion cannot take place, because the further turning of the spindle 4 maintains in all parts concerned a preliminary tightening-up by means of its axial thrust of such strength that an interruption of the mutual contact cannot take place. Owing to the pressure which the spindle 4 exerts upon the transverse supporting member 40 there is especially the spindle 5 kept under tension. If then the next cutting edge of the milling cutter commences to operate, all parts are still blocked-up mutually and no unwished-for movements and irregularities in the feed can occur.

An elastic preliminary tightening-up of loosenings of the contacting members due, perhaps, to wear and tear can be obtained, according to the modified constructional form shown in Fig. 6, in this way that the ball-bearing 50 is provided with an elastic supporting member 52 acting as power accumulator. In this case a rigid transverse supporting member 40 is used. Owing to the pressure exerted by the spindle 4 on the transverse supporting member 40 the spindle 5 is subjected to a pull and the milling table 6 is subjected to pressure, in consequence whereof the elastic member 52 is compressed. When the pull exerted upon the spindle 5 ceases and the pressure exerted upon the table 6 becomes lower the elastic member 52 can expand and thereby ensure the proper mutual contacts of the parts concerned.

The requisite preliminary stressing can be adjusted with the aid of a graduated scale provided on the tensioning nut 27 located on the right-hand end of the spindle 5, that scale cooperating with a zero mark provided on the plate 25 opposite the said scale. By drawing tight the tensioning nut 27 the sides of the thread of the spindle 5 are drawn more strongly against the sides of the thread 3¹ of the nut 3³, and as by that drawing tight of the nut 27 also the lower end of the transverse member 40 is caused to act on the thrust piece 43, also the sides of the thread of the spindle 4 are pressed more strongly against the sides of the thread 2¹ of the nut 3³, and besides the upper end of the transverse supporting member 40 presses the milling table to the left whereby the elastic member 52 is subjected to tension. At the same time, owing to the preliminary tightening-up pressure exerted upon the wheel 15 in the manner described, also the flank contact and the axial thrust of the toothings of the four helical wheels are obtained, as is also a tightening-up of the two threaded spindles 4, 5 in tangential direction.

By this arrangement is attained that an elastic preliminary tightening-up can be produced by the actuation of only one member, viz., by turning the tensioning nut 27.

By effecting a preliminary tightening-up, it is prevented even under the most unfavorable conditions that during the non-cutting period of the milling cutter, that is to say when one milling tooth leaves the work-piece and the next tooth has not yet entered into engagement with the work-piece, the tightening-up state in the gearing can drop to zero. During the operation of the milling cutter the milling pressure acts solely upon completely rigid members, so that any yieldability is completely done away with.

In order to increase the effect intended there are, in the constructional form shown by way of example, the two nut threads 2¹ and 3¹ united in a nut 3³ consisting of one piece (Figs. 1 and 4), the supporting point of which is formed by a pivot 49 whose middle lies outside the line between the axes of the two spindles 4 and 5. If, with this arrangement, the spindle 5 is loaded in the direction of the feed by an extraordinarily strong milling pressure and if, at the same time, an elastic expansion of the nut 3³ in the same direction is brought about, the nut will exert at the same time an increased pressure upon the left-hand sides of the thread of the spindle 4 and will ensure a stronger contact of the flanks of both spindle threads. The nut is held fast in its position in the machine frame or in the transverse slide 1¹ of the machine (Fig. 4) by a second supporting body 53.

If the direction of turning of the spindle 4 is altered, for instance for the purpose of returning the milling table, then the spindle 4 is moved in the direction indicated by the arrow c (Fig. 75.

2), and at the same time the helical wheel 14 is, owing to the inclination of its teeth, subjected to pressure in the direction of the arrow d. By reason of these two pressure actions which are counter to one another the gearing is released from the tightening-up.

In the example shown the feed gearing is provided at only one end of the table, but a similar gearing could be provided also at the other end whereby equidirectional milling in both directions would be rendered possible.

In Fig. 7 is shown the application of the device according to the invention when milling gear-wheels on milling machines of the generating type.

The vertically shiftable, but not rotatable threaded spindle $5^2$ serves for moving a vertically guided slide, which carries in known manner the milling tool (omitted in this figure). On the spindle $5^2$ are arranged the two nuts $3^1$ and $3^2$ which are rotatably supported in the casing 32. To each of these nuts is attached a helical wheel 14, or 15 respectively, the two wheels having teeth with oppositely directed inclination. The helical wheel 14 is firmly connected with the nut $3^1$ and is provided with coupling teeth 33 engaging counter coupling teeth of a sleeve 34 loosely supported on the nut $3^1$. With said sleeve is firmly connected the driving worm-wheel 35. The rotation of the wheel 35 entails a rotation of the nut $3^1$, but the helical wheel 14 can be axially shifted and takes along with it the nut $3^1$.

The helical wheel 15 is arranged on the nut $3^2$ so that it cannot be moved axially, but every rotation of the wheel 15 entails a rotation of said nut.

The helical wheel 14 meshes at oppositely located places with the helical wheels $18^3$ and $18^5$, whereas the helical wheel 15 meshes with a helical wheel $18^6$. The rotation of the helical wheel 14 is transmitted to the wheel 15 by means of the helical wheels $18^5$ and $18^6$. The wheel $18^3$ is subjected to the action of a pressure accumulator, for instance a rubber body 55 arranged in a sleeve 56. The two wheels $18^3$ and $18^5$ support, by the intermediary of ball-bearings inserted therebetween, a transverse supporting member $40^2$. The said rubber body presses the wheel $18^3$ against a friction surface. Simultaneously therewith said supporting member $40^2$ is pressed upwardly by the rubber body 55 whereby also the wheel $18^5$ is pressed against a friction surface. Owing thereto, the friction between the wheels $18^3$ and $18^5$ on the one side and said friction surfaces on the other side is increased which entails a greater turning moment in the wheel 14, whereby, in turn, also the axial thrust of the helical wheels is increased. As the transverse supporting member $40^2$ abuts on the upper nut $3^2$, or on the upper helical wheel 15 respectively, pressure is exerted also upon this wheel and the axial thrust is increased.

Owing to the insertion of the transverse supporting member $40^2$ there is attained also with the constructional form in question a tightening-up of the two nuts $3^1$ and $3^2$ on the spindle $5^2$ in opposite directions so that the two nuts firmly abut in opposite directions on the thread flanks of the spindle and every back-lash between the parts is obviated.

I claim:

1. In a device for equidirectional milling in which the forward feed of the work and the operative motion of the milling cutter have the same direction, in combination, two screw threaded feed members, one of said feed members being axially freely shiftable, means for driving one of said two feed members, helical wheels having oppositely inclined teeth for transmitting the rotary motion of said driven feed member to the other feed member, and yieldable means between said two feed members and adapted to transmit the axial pressure, exerted by one feed member to the yieldable means, to the other feed member in such a manner that the threaded faces of the two threaded feed members contact in opposite directions.

2. A device for equidirectional milling, in combination, with the table of a milling machine, two threaded spindles, one of said spindles being axially shiftable in said table, a screw nut on each of said spindles, said spindles adapted for feeding the table of the milling machine, means for driving one of said spindles, helical wheels having oppositely inclined teeth for transmitting the rotary motion of one of said spindles to the other, and yielding means for connecting the said two spindles with one another and for transmitting the axial pressure, exerted by one spindle to the yielding means, to the other spindle, in such a manner, that the threads of said spindles contact in opposite direction with the threads of said nuts.

3. A device for equidirection milling, in combination, with the table of a milling machine, two threaded spindles, one of said spindles being axially shiftable in said table, a stationary screw nut on each of said spindles, said spindles adapted for feeding the table of the milling machine, means for driving one of said spindles, helical wheels having oppositely inclined teeth for transmitting the rotary motion of one of said spindles to the other and a transverse supporting member abutting on the milling table, said two spindles being in driving connection with said transverse supporting member in such a manner, that the two spindles are loaded in opposite directions at the commencement of the feeding-on movement of said shiftable spindle, as well as at the commencement of the cutting pressure and that the said helical wheels are shifted in opposite direction to the cutting pressure for producing an initial stressing of the gearing.

4. A device for equidirectional milling, in combination, with the table of a milling machine, two threaded spindles, one of said spindles being axially shiftable in said table, a stationary screw nut on each of said spindles, said spindles adapted for feeding the table of the milling machine, means for driving one of said spindles, helical wheels having oppositely inclined teeth for transmitting the rotary motion of one of said spindles to the other, a transverse supporting member abutting on the milling table, said two spindles being in driving connection with said transverse supporting member in such a manner, that the two spindles are loaded in opposite directions at the commencement of the feeding-on movement of said shiftable spindle, as well as at the commencement of the cutting pressure and that the said helical wheels are shifted in opposite direction to the cutting pressure for producing an initial stressing of the gearing, and means for adjustably loading said transverse supporting member from the outside of the gearing.

5. A device for equidirectional milling, in combination, with the table of a milling machine, two threaded spindles, one of said spindles being axially shiftable in said table, a stationary screw nut on each of said spindles, said spindles adapted for feeding the table of the milling machines, means for driving one of said spindles, and helical wheels for transmitting the rotary motion of one of said spindles to the other, a transverse supporting member abutting on the milling table, said two spindles being in driving connection with said transverse supporting member in such a manner, that the two spindles are loaded in opposite directions at the commencement of the feeding-on movement of said shiftable spindle, as well as at the commencement of the cutting pressure so as to cause the threads of said spindles to contact in opposite directions with the threads on said nuts, and that the said helical wheels are shifted in opposite direction to the cutting pressure for producing an initial stressing of the gearing, an adjusting nut arranged on one of said threaded spindles and acting upon said transverse supporting member, and power accumulators in said gearing adapted for producing an elastic initial stressing of said gearing.

6. A device for equidirection milling, in combination, with the table of a milling machine, two threaded spindles, one of said spindles being axially shiftable in said table, two nut threads in cooperation with said threaded spindles and united in one stationary nut, said spindles adapted for feeding the table of the milling machine, means for driving one of said spindles, and helical wheels for transmitting the rotary motion of one of said spindles to the other and a lever-like member for connecting the said two spindles with one another in such a manner that the thrust and pressure forces arising at the commencement of the feeding-on movement of said shiftable spindle, or at the commencement of the cutting pressure respectively, are transmitted from one spindle to the other, so as to cause the threads of said spindles to contact in opposite directions with the threads of said nuts.

7. A device for equidirectional milling, in combination, with the table of a milling machine, two threaded spindles, one of said spindles being axially shiftable in said table, two nut threads in co-operation with said threaded spindles and united in one nut consisting of one piece, a pivot for said nut and arranged in the frame of the machine, the middle of said pivot lying outside of the line between the axes of said two spindles, said spindles adapted for feeding the table of the milling machine, helical wheels for transmitting the rotary motion of one threaded spindle to the other, and an intermediate member for connecting the said two spindles with one another in such a manner that the thrust and pressure forces arising at the commencement of the feeding-on movement of said shiftable spindle, or at the commencement of the cutting pressure respectively, are transmitted from one spindle to the other, so as to cause the threads of said spindles to contact in opposite directions with the threads of said nut.

VIKTOR JERECZEK.